(12) United States Patent
Adkins

(10) Patent No.: US 7,433,923 B2
(45) Date of Patent: Oct. 7, 2008

(54) AUTHORIZED EMAIL CONTROL SYSTEM

(75) Inventor: Reginald Adkins, 451 Ridgefarm Dr., San Jose, CA (US) 95123

(73) Assignee: Reginald Adkins, San Jose, CA (US)

( * ) Notice: Subject to any disclaimer, the term of this patent is extended or adjusted under 35 U.S.C. 154(b) by 937 days.

(21) Appl. No.: 10/491,759

(22) PCT Filed: Oct. 3, 2002

(86) PCT No.: PCT/IB02/05823

§ 371 (c)(1),
(2), (4) Date: Apr. 2, 2004

(87) PCT Pub. No.: WO03/044617

PCT Pub. Date: May 3, 2003

(65) Prior Publication Data

US 2004/0243844 A1  Dec. 2, 2004

(51) Int. Cl.
G06F 12/14  (2006.01)
G06F 15/16  (2006.01)

(52) U.S. Cl. ............... 709/206; 709/224; 709/225; 726/22

(58) Field of Classification Search .............. None
See application file for complete search history.

(56) References Cited

U.S. PATENT DOCUMENTS 6,112,227 A    8/2000  Heiner ............... 709/203
6,199,102 B1   3/2001  Cobb ................ 709/206
6,732,149 B1*  5/2004  Kephart .............. 709/206
2003/0023736 A1* 1/2003 Abkemeier ........... 709/229

FOREIGN PATENT DOCUMENTS

GB    2347053 A  *  8/2000

* cited by examiner

Primary Examiner—Patrice Winder
(74) Attorney, Agent, or Firm—Michael A. Glenn; Glenn Patent Group

(57) ABSTRACT

An authorized email control system receives email destined for a particular user. Inclusive, temporary and exclusive address books are provided for the user. The inclusive address book lists all the sender email addresses and domains names that the user wants to allow into his mailbox. If the received email message's sender is listed in the user's inclusive or temporary address book then the email is placed in the user's main mailbox. If the sender is listed in the user's exclusive address book, then the message is deleted. The invention truncates the body of the received email message to a user settable length which is sent through at least one extensible message filter that provides a pass/fail indicator and optionally provides reasons for a fail indication. If the truncated email body passes all of the filters, then the sender is added to an accepted sender list. Otherwise, the sender is warned that its email was rejected and the reason(s) why. The sender's domain name is then placed on an unaware domain list. The user is conditionally notified if the sender has been added to the sender list or unaware domain list, giving the user the option to add the sender to his inclusive or exclusive address book.

27 Claims, 13 Drawing Sheets

1201

| Account Information | Account Options |

Account Type: POP Account

Description: Home — Examples: Work, Personal
Email Address: steve@mac.com — Example: steve@mac.com
Full Name: Steve Smith — Example: Steve Smith Host name: localhost — Example: mail.mac.com
User name: steve — Example: steve
Password: ••••••••

SMTP Host: localhost — Example: smtp.mac.com
☐ Use authentication when sending mail
SMTP User: — Example: steve
SMTP Password:

AUTHORIZED EMAIL CONTROL SYSTEM

BACKGROUND OF THE INVENTION

1. Technical Field

The invention relates to sending and receiving electronic mail across the Internet. More particularly, the invention relates to the detecting and challenging of unsolicited electronic mail across the Internet.

2. Description of the Prior Art

The use of electronic mail (email) has proliferated across the world at an incredible rate. Email has become an integral part of people's everyday corporate and personal lives. People communicate via email across continents, towns, streets, and cubicles with friends, family, co-workers, and businesses.

Email is much quicker and convenient to send than a conventional letter. Email users send and receive many emails during any particular day.

However, as with every technological innovation that has been introduced to the masses, there are abusers of email. Commercial enterprises have made a business of creating commercially questionable uses of email. One of the most common commercial abuses of email is sending a mass number of emails to random email addresses. This accomplishes the same effect as junk mail. Users are deluged with unsolicited junk email, otherwise called "spam". The producers of spam are not selective in the type of email users that the spam is sent to; both young and old, male and female are spammed.

A major producer of spam is the online pornography industry which sends out huge amounts of spam to unsuspecting email users on a daily basis. Children, as well as adults are receiving this type of unwanted email.

Email users are becoming increasingly frustrated with the high volume and frequency of spam. Some users log onto into their email accounts to find that their mailbox is full of spam with no room left for personal email. Spam wastes users' time and reduces productivity.

Referring to FIG. 1, some email service providers 101 such as Yahoo, Inc. of Sunnyvale, Calif., have reacted to their user's complaints and allow users to specify email addresses and domain names that they do not want to receive email from in a junk emailer list 106. Email destined for a particular user 102 is received by the email service provider 101. The email service provider 101 looks at each email massage's sender field and determines if the email originated from a junk emailer 103 listed on the user's junk emailer list 106. Any such email is stored in the user's bulk mailbox 105 while other emails are saved in the user's normal mailbox 105.

This approach is effective for the email addresses and domain names that the user lists, but requires that a user be proactive and enter the unwanted email addresses and domain names into the junk emailer list Another drawback is that the user must subscribe to the email provider's service.

It would be advantageous to provide an authorized email control system that provides automatic filtering and challenging of unauthorized senders of email to a user. It would further be advantageous to provide an authorized email control system that integrates into an email server architecture as well as a client system.

SUMMARY OF THE INVENTION

The invention provides an authorized email control system. The system provides automatic filtering and challenging of unauthorized senders of email to a user. In addition, the invention integrates into an email server architecture as well as a client system architecture.

A preferred embodiment of the invention receives email destined for a particular user. Inclusive, temporary, and exclusive address books are provided for the user. The inclusive address book lists all the sender email addresses and domains names that the user wants to allow into his mailbox. The exclusive address book lists all the sender email addresses and domains names whose email messages are to be deleted upon receipt. The temporary address book behaves like the inclusive address book, except it only contains email addresses and entries in this book last only a user specified amount of time.

The invention checks if the received email message's sender is listed in the user's inclusive or temporary address books. If the sender is, then the email is placed in the user's main mailbox. If the sender is not in the inclusive or temporary address book, then the invention checks if the sender is listed in the user's exclusive address book. If the sender is, then the message is deleted.

The invention truncates the body of the received email message to a user settable length. Extensible message filters are provided that analyze contents of the truncated email body for information such as: offending words, phrases, commercial content, phone numbers, mailing addresses, Web links, contact information, and attachments. The truncated email body is sent through the filters. Each filter provides a pass/fail indicator and optionally provides reasons for a fail indication.

If the truncated email body passes all of the filters, then the sender is added to an accepted sender list (if the sender is not already on the list). The user is conditionally notified that the sender has been added to the sender list, giving the user the option to add the sender to his inclusive or exclusive address book.

If the truncated email body does not pass all of the filters, then the sender is warned that its email was rejected and the reason(s) why. The sender's domain name is then placed on an unaware domain list (if the sender is not already on the list). The user is conditionally notified that the sender has been added to the unaware domain list, giving the user the option to add the sender to his inclusive or exclusive address book.

If the sender is not listed in the inclusive, temporary, and exclusive address books then a challenge message is sent to the sender. The challenge message instructs the sender on how to properly respond to the challenge message. If a response to the challenge message is received from the sender, it is analyzed for the proper response format.

The sender is added to an accepted sender list if the response is in the proper response format and the sender is not already on the accepted sender list. The user is notified that the sender has been placed on the accepted sender list and is given the option to add the sender to the inclusive or exclusive address book.

The sender's domain name is added to an unaware domain list if the response is not in the proper response format and the sender is not already on the unaware domain list. The user is notified that the sender has been placed on the unaware domain list and is given the option to add the sender to the inclusive or exclusive address book.

The user is also conditionally notified each time a message is pended on the unaware domain list or the accepted sender list.

Other aspects and advantages of the invention will become apparent from the following detailed description in combina-

BRIEF DESCRIPTION OF THE DRAWINGS

FIG. 12 is a diagram of an account information user interface preference window for an email client according to the invention.

DETAILED DESCRIPTION OF THE INVENTION

Figure 1:
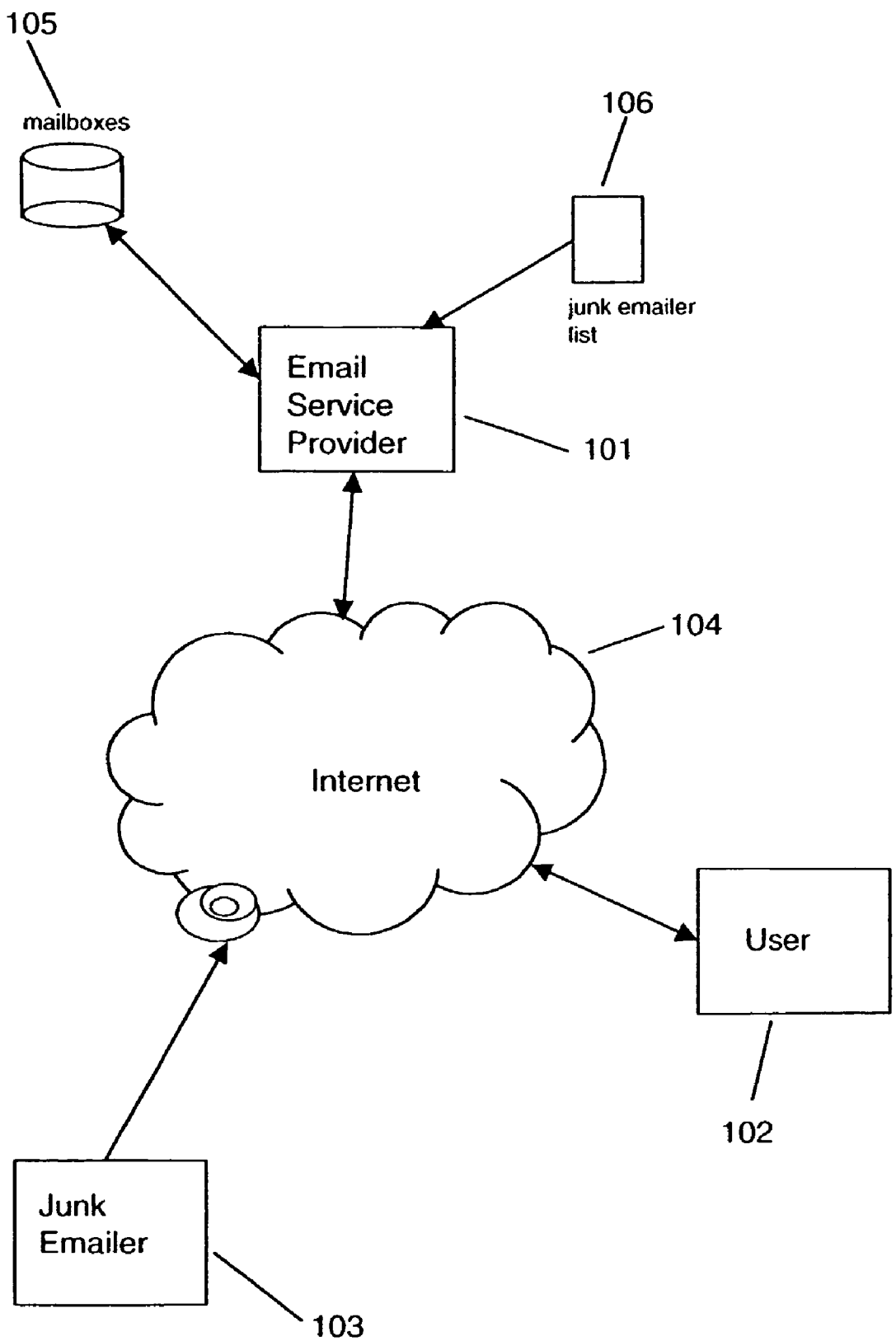
FIG. 1 is a diagram of a prior art approach of an email service provider using a junk emailer list according to the invention.

The invention is embodied in an authorized email control. A system according to the invention provides automatic filtering and challenging of unauthorized senders of email to a user. In addition, the invention integrates into an email server architecture as well as a client system architecture.

The invention provides an authorized email control system for servers, clients, and mobile clients, that allows a user to protect an e-mail account from unsolicited email (spam), commercial or otherwise, while still allowing legitimate senders to contact the user through email. Email messages from unknown entities or users are filtered for contact information. Any emails that do contain contact information are automatically challenged and verified via email.

The invention provides a contact list of authorized senders that a user enters email addresses and domain names that he wants to receive email from. The invention can also use an external contact list specified by the user to augment its own contact list. The invention places email from those addresses and domains into the user's mailbox. The contact list prevents spam from entering the user's mailbox and stops the user from wasting time with unwanted and sometimes offensive content.

The invention auto-responds to unauthorized email senders with an authorization acknowledgement email message asking them to send the user a message that is of a limited length, e.g., three lines or fewer of plain text, and containing no contact information, i.e., without Web browser links, Web references (information that can be used to reconstruct a Web link), phone numbers, or mailing addresses. These constraints give enough flexibility for legitimate senders to describe who they are, but are too restrictive to be commercially useful to spammers.

Incoming messages are not deleted (except for specified senders and domains) so the user never loses any e-mail. All messages from unauthorized senders are placed in a pending mailbox outside of the users inbox. The invention can also show the user either the email address or domain name of senders without actually exposing him to a message's content or subject line. If a commercially useless message from an unknown sender or a new message from a previously unknown domain is received, the invention notifies the user through a system dependent notification means. If the user chooses to deal with the notification, a window is launched that allows the user to update his list of authorized senders. Unsolicited commercial email can be automatically discarded without fear that a legitimate message will be lost.

As shown below, the invention is highly configurable by the user. The user can, for example, customize the standard authorization acknowledgement message's text to better express his situation, e.g., express that the user is under the age of eighteen and should not be receiving pornographic advertisements.

The invention provides three ID lists that it uses to perform the tasks of accepting, rejecting, and challenging incoming email.

Address Books/Contact Lists

Address books contain both email addresses and domain name addresses. There are three kinds of address books used by the invention:

1) inclusive
2) exclusive
3) temporary

Figure 2:
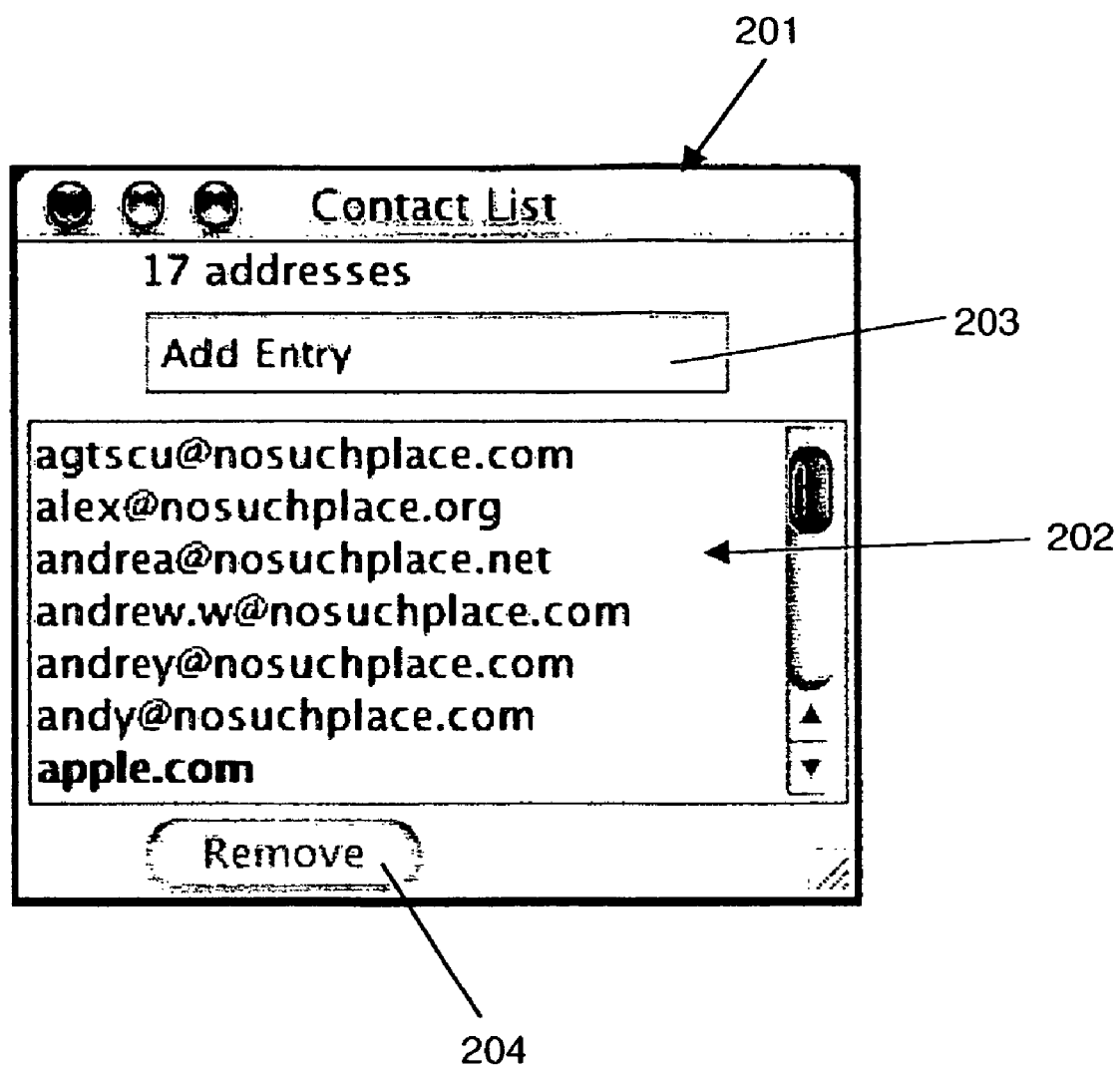
FIG. 2 is a diagram of an address book/contact list user interface window according to the invention.

With respect to FIG. 2, the user maintains his inclusive address book/contact list 201. The inclusive address book/contact list 201 lists all the senders and domains 202 that the user wants to allow into his mailbox. A domain name represents an entire company or organization. Messages sent from senders found in the inclusive address book are allowed directly into the user's mailbox.

The user can select an email address or domain name in the other ID list windows and click the "Add To Contact List" button at the bottom of the respective window to add the email address or domain name to the inclusive address book/contact list 201. The user can also add an entry to the Contact List window by typing in an email address or domain name into the text field 203 at the top of the Contact List window and hitting return.

The user can remove addresses (or domain names) from the inclusive address book/contact list 201 to prevent a sender (or domain) from entering the user's mailbox. Removal of an email address or domain name is accomplished by selecting the email address or domain name in the list 202 and clicking on the "Remove" button 204. When the user removes an ID list entry, the system can give the user an option to add the removed sender to his exclusive list so that future messages from the sender are suppressed. The system can warn the user against taking this action, since he will not be notified of future messages from entries on the exclusive list.

The user also maintains his exclusive address book. Messages sent from senders found in the exclusive address book are deleted, but the sender is not warned.

The temporary address book behaves like the inclusive address book, except it only contains email addresses (no domain names) and entries in this book last only a user specified amount of time. The invention adds an entry to the temporary address book when the user sends a message to a recipient whose address is not in his inclusive address book. This allows the user to hear back from recipients that he initiates contact with.

Replying to a sender on the sender ID list does not automatically place the sender's email address in the temporary address book.

Domain ID List

Figure 3:
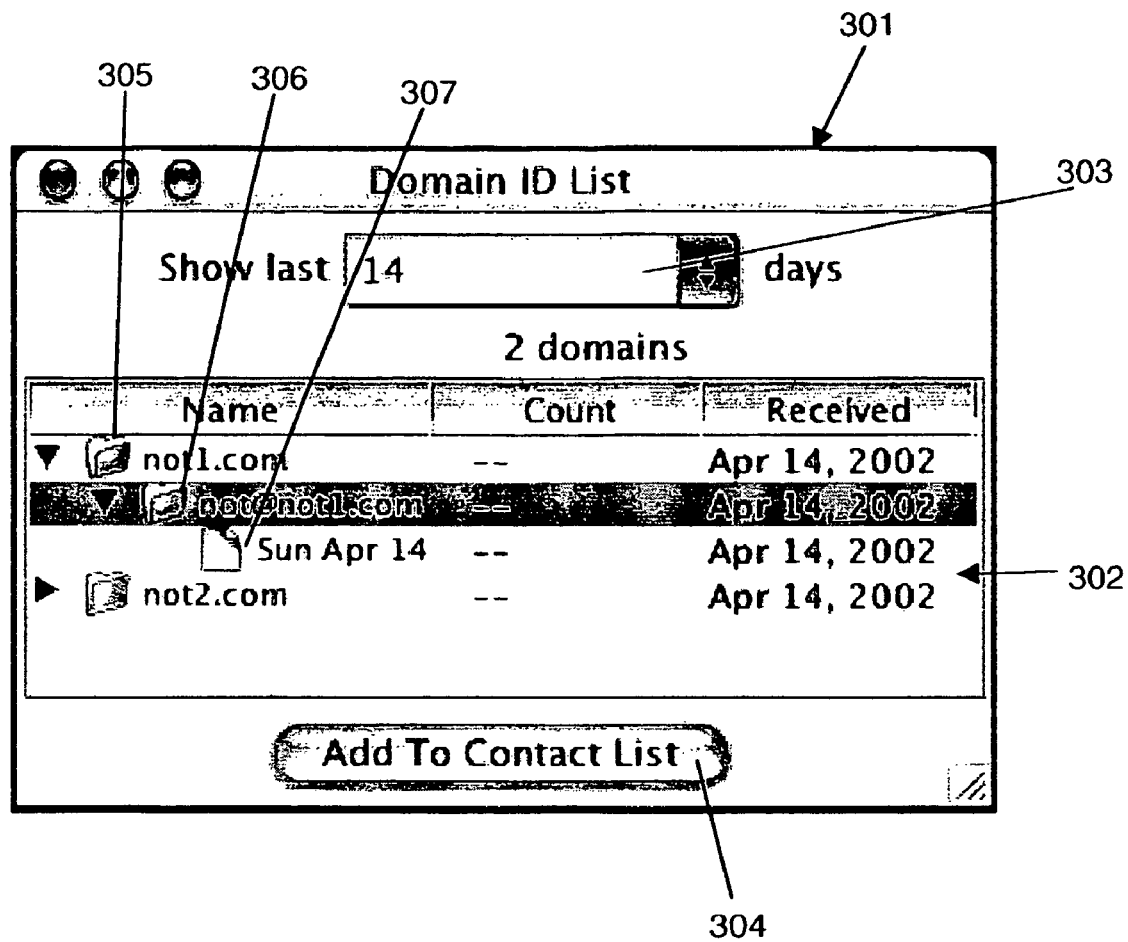
FIG. 3 is a diagram of an domain ID list user interface window according to the invention.

Referring to FIG. 3, the domain ID list 301 represents the domains of all "unaware" or unauthorized senders. Unaware senders are senders not in the user's address book.

The user is notified when a new and unique entry is added to the list. In this manner, the user is actively informed when a message is received from a contemporary "unaware" auto-mailer. The user, once notified, has three choices:

1. Add the domain name to his inclusive address book.
2. Suppress the domain name from the domain ID list.
3. Ignore the notification (do nothing).

If the user adds the domain name to his address book by clicking on the add button 304, he will receive all messages from that domain. The user will also receive all of the pending "unaware" messages recently sent from that domain. If the user suppresses a domain name it will no longer appear on the domain ID list. The user may also choose to completely ignore the notification—he won't be actively notified of it again. New messages from a suppressed domain show up, but don't necessarily count as a message from a "new" domain. When the invention is integrated into a mail client, the user can "unauthorized" all messages from a previously authorized domain or sender, causing all the messages from the newly unauthorized sender (since they were originally authorized) to be optionally deleted or returned to the pending store from which they originated.

If the notification causes the user to recognize a domain name as one that he has requested services from, he can easily add it to his address book by clicking on the add button 304. The user may also choose to actively suppress the listing of a domain name, especially those suspected of representing companies and/or ISPs that generate spam. Doing nothing is the simplest course of action.

The user interface can allow progressive disclosure of a pended message's content. The user double-clicks on the domain name 305 in the list 302 to see the list of senders 306 from that domain. He then double-clicks on the sender's e-mail address 306 to see the list of messages from that sender. The user can double-click on a message icon 307 to see the contents of that pended message. The message icon 307 can display the date the message was received, sent, or the message subject.

The invention can automatically detect and suppress a domain name it suspects is likely to be used by spammers. The invention can automatically suppress such a domain from the domain ID list when the domain generates many distinct senders, surpassing a user specified count threshold. Such a domain is not likely to represent a single legitimate company, organization, or entity. It is more likely to represent a domain that is used by spammers.

If an ISP's domain is suppressed and that ISP later wants to provide services via email, it's always a good idea that the ISP distinguish its mailings from those of its user accounts. This can be done by simply sending from a different machine/domain than the common users. Some ISPs already do. A small number of ISPs represent the greatest number of users, hence, only a handful of ISPs not already following this practice will need to change.

Messages whose senders have not yet acknowledged the invention's filtering efforts and/or sent an acceptable message are temporarily stored on the domain ID list as pending entries. They can be removed from the list if their senders later send an acknowledgement. This allows a user to recognize the domain name of a site that he has requested services from that sends immediate email messages coincident with service activation or companies that send receipts after a successful transaction. Such services' notifications and receipts will be available immediately, represented as pending entries on the domain ID list 301.

The domain list 302 is usually sorted by date-of-last-contact for each domain so that the user has an improved chance of seeing the most recent legitimate corporate auto-mailers that he has requested services from appear at the top.

The user also has the option to filter 303 the entries on the ID list to include just the most recent entries sent in the last few hours, or days.

Sender ID List

The sender ID list is similar in format to the domain ID list but primarily contains the email address of accepted senders. An accepted sender is any sender whose messages pass all of the system filters.

The user is informed when a new and unique entry is added to the list. They can also be informed whenever any entry is added to the list. In this manner the user is actively notified when an acceptable sender has sent a message. The user, once notified, has three choices:

1. Add the sender's e-mail address to his inclusive address book.
2. Suppress the sender's email address from the sender ID list.
3. Ignore the notification (do nothing).

If the user adds the sender to his inclusive address book, he will receive all messages from that sender. The user will also receive all of the pending messages sent recently from that sender in their mailbox. If the user suppresses a sender's address, it will no longer appear on the sender ID list and will be added to his exclusive address book. The user may also choose to completely ignore the notification—he won't be actively notified of it again (unless he requests it).

If the accepted sender's email address is not sufficient for the user to recognize the sender's identity, the invention allows the user to view the text of the sender's acceptable message. The system's filters are designed to ensure that three lines (a configurable value) of an acceptable message will contain no commercially useful contact information other than an email address. It is recommended that email clients never display to the user more than three lines (or the configured value) of an acceptable message, until after the user has made the decision to add the sender to their address book.

Operation

Mail is received by the invention and is routed according to the following rules/observations:

There are two kinds of incoming senders—those in the user's inclusive address book and those that are not.

Those incoming senders in the user's inclusive address book have their messages placed in the user's mailbox.

Of those incoming senders not in the user's address book, there are two kinds—those who have been requested to acknowledge the invention's filtering efforts and those who have not. Those not (yet) requested to acknowledge the invention's filtering efforts are sent an authorization acknowledgement message (with the practical exceptions of confirmed automated systems such as mailing lists, MAILER-DEAMONS, and reply-to addresses in the user's address book). The message warns the sender of the user's filtering efforts and requests that the sender acknowledge the message by sending a specially formatted (possibly empty) message.

Of those requested to acknowledge the filtering efforts, there are two kinds—those that have acknowledged the filtering efforts within a user specified time interval and those that have not. Those that have not acknowledged the filtering efforts within a user specified time interval (as described below) have their domain address added to the domain ID list representing the domain names of all unaware senders.

Of those that have acknowledged the filtering efforts within a user specified time interval, there are two kinds of messages represented by them—those messages that are acceptable and those that are not. Acceptable messages are messages that pass all of the invention's filters.

The first filter that is employed without exception is an "effectively truncate to no more than three lines (240 characters) of non-blank text" filter. All subsequent filter operations are performed on these 240 characters. The 240 character limit is a default value that performs well and the value is user modifiable. The goal of the remaining filters is to constrain the user from having any means of contacting a commercial sender except to "reply-to:" their email address. The sender of an acceptable message is added to the sender ID list.

Another very useful filter is to only find messages sent exclusively to the user's email account (and no others cc:'d or bcc:'d) acceptable.

Implementations may accept filter plug-in modules that operate on up to three lines of non-blank text and reject any truncated message they deem contains contact information. Default plug-in modules may reject an aware sender's message if it has an attachment. The modules can look for vulgar words deemed inappropriate for a first contact or filter out global phone numbers, mailing addresses, browser links, etc.

Unacceptable messages are messages that are rejected by at least one of the invention's filters. The sender of an unacceptable message is warned that his original message was rejected and the reason(s) why.

Human senders with legitimate reasons to contact the user will have no trouble sending at least an empty message as an acknowledgement. In contrast, no existing auto-mailer today is currently prepared to send an acknowledgement in response to the invention's request. Hence, all auto-mailer mailings today, including all commercial spam, will be considered "unaware" senders. Their messages will be represented only by their domain name on the domain ID list. Since the user is not shown the contents or subject lines of such an incoming message directly, he is never exposed to commercial spam.

Spammers who spam email systems enabled with the invention, will also experience a distributed denial of service (DDOS) attack initiated by their own actions. This attack will be proportional to the number of systems that are sent messages. For example, if a spammer sends 20 million messages, and 2 million reach systems enabled with the invention, the spammer will have to either accept and acknowledge 2 million messages (then attempt to get a commercially useful three-line message past the invention's sophisticated filters) or have the messages' sending domain(s) get pummeled with 2 million acknowledgement requests. In either case, the invention increases the cost of operations for spammers. Their resource requirements will be considerably higher than for today's passive mail clients.

Alternative warnings can be sent that include a warning that the e-mail recipient is a minor. Pornographic vendors in the U.S. that send unsolicited e-mail cannot afford to be caught with a large list of recipients that have explicitly informed them that they are minors. The pornographer cannot know if the recipient actually is a child, but they also cannot take the chance that the recipient may actually be a child. They would be risking a possible violation of federal, state (and possibly international) law if they did not remove such addresses from their mailing lists and sent future messages to those addresses. The invention can make it easy to include online references to U.S. federal and international laws concerning the solicitation of minors in the warning.

Spoofing is a term that means to impersonate another sender or the user himself. If a spammer gets a hold of a user's address book or figures out which companies the user does business with before the companies take measures to secure their customer communications, then typical email protection systems are vulnerable to spoofing. A possible way to collect addresses in the user's address book, for example, would be to set up an online greeting card service that is really a front for spamming operations to collect pairs of friendly senders.

Encryption technologies can solve the spoofing vulnerability by letting email users be sure that whom they are conversing with is really who they say they are.

Digital signatures can be used so that a customer can "know" that when they get a message from amazon.com, it really is from Amazon. A message with a return address of amazon.com, for example, not genuinely signed by amazon.com (using digital signatures) when the invention can determine that amazon.com has a published signature, cannot be used to perform a distributed DDOS attack using a system enabled with the invention against an arbitrary target because the invention willnot auto-respond to an unsigned, or incompatibly signed, message originating from a signed domain. The details of digital signatures and cryptography are well known in the art.

A public key can be used to encrypt a sender's message so that spammers cannot sniff packets and learn the contents of the user's address book by watching with whom he converses. Public keys can also be used by individuals and companies to securely converse with each other without a spammer eavesdropping or inserting themselves into the conversation.

Figure 4:
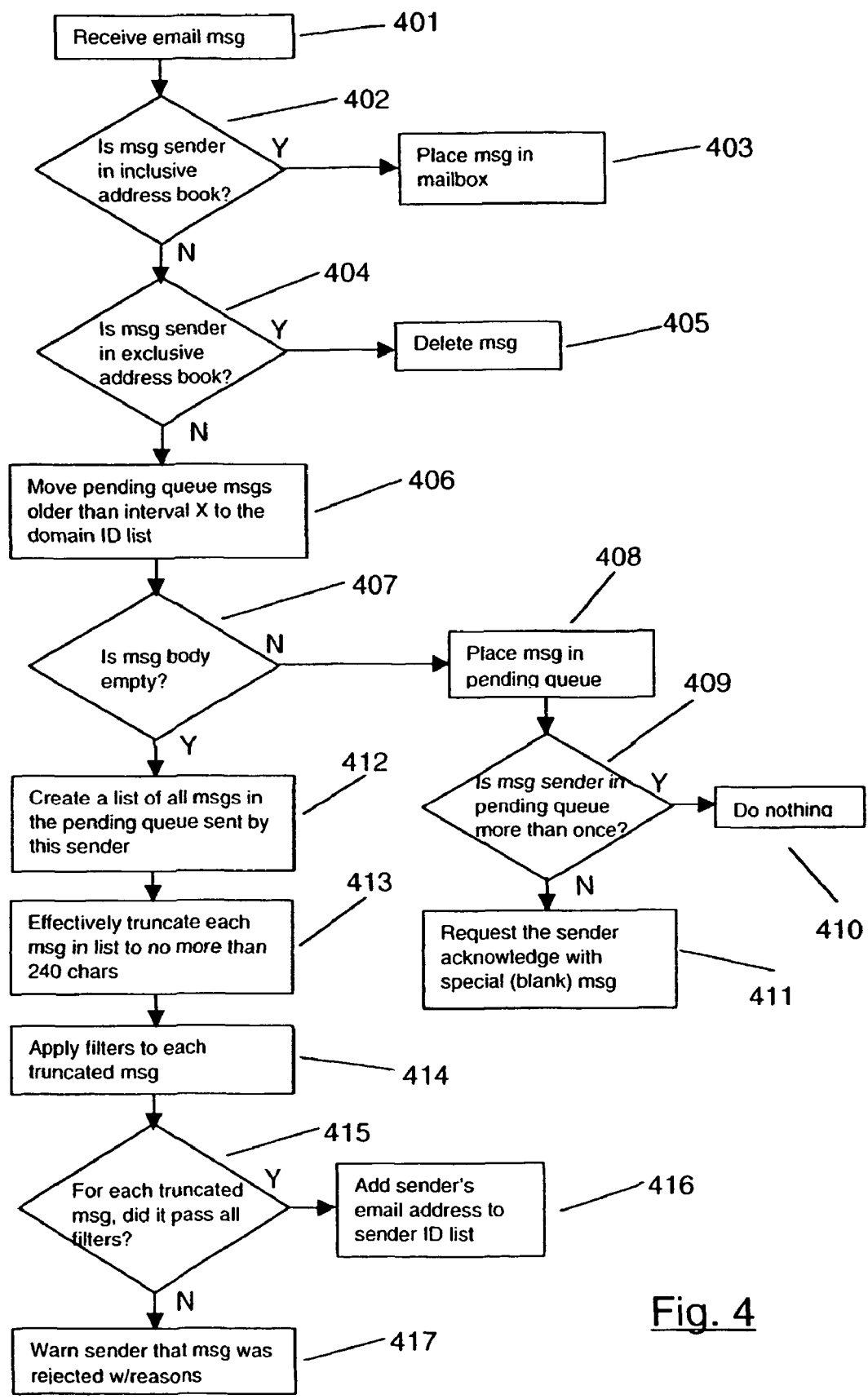
FIG. 4 is a block schematic diagram of a flowchart showing the steps taken in a preferred embodiment of the invention for identifying unauthorized senders of email to a user according to the invention.

With respect to FIG. 4, a preferred embodiment of the invention receives an email 401. As described herein, depending on whether the invention is server or client based (discussed below), the email will be directly received (server implementation) or received from an email server (client implementation) such as a POP server, IMAP server, etc. The invention checks if the email's sender is listed in the user's inclusive address book or temporary address book 402. If the sender is, then the email is authorized and is placed in the user's main mailbox 403.

If the sender is not in the inclusive or temporary address book, then the invention checks if the sender is listed in the user's exclusive address book 404. If the sender is, then the message is not wanted by the user, i.e., the sender or the sender's domain is blocked, and it is discarded 405.

If the sender is not listed in the exclusive or temporary address book, then the invention checks the pending queue for messages that are older than a user settable time interval. The senders of those emails that have exceeded the time interval are placed on the domain ID list (if the sender is not already on the list) 406. This step can be periodically checked, rather than occurring whenever an email message is received. The time interval is used to distinguish between filter aware and unaware senders. When the time interval passes for a message, it indicates that the sender is not filter aware. The user is notified if the sender has been added to the domain ID list, giving the user the option to add the sender to his inclusive or exclusive address book (as described above).

The received email body is checked (filtered) to see if the message body is empty 407. The message can also be filtered to check if the body provides no new or different information contained in the challenge message. This allows the sender to simply reply to the challenge message. If the body is not empty, then the message is placed in the pending queue 408, which means that the sender may not be an aware sender. The pending queue is checked to see if the sender has more than one message in the queue 409. If the sender has more than one message in the queue then the system does nothing 410 because the sender can send multiple messages within the user settable time interval.

If the sender has only one message in the pending queue, then a challenge is issued to the sender, requesting that the sender send an acknowledgement with a special (blank) message body 411. If the filter checks for no new or different information contained in the challenge message as described above, the sender can auto-reply to the challenge message.

If the body is empty (or provides no new or different information contained in the challenge message), then a list of all the messages from the sender in the pending queue is created 412. Each of the messages in the list have the message bodies truncated to a user settable length 413. A length of 240 characters is one that produces good results with the typical mix of messages. The invention applies a filter that rejects messages larger than a certain logical length to make it easier for subsequent filters to ascertain contact information.

Filters are applied to the truncated messages to check, for example, offending words, phrases, commercial content, global phone numbers, global mailing addresses, Web links, attachments, etc. 414. For example, phone numbers and addresses must be at least four numeric digits. Filters can be plug-in modules which provides extensibility. The filters can perform any heuristics and may reject messages with or without warnings.

Another optional filter (not based on contact information) is to only accept messages sent exclusively "To:" the user's email address, and no others. If it is not exclusively "To:" the users protected email address, it should not be acceptable.

The goal of the invention's filters is to attempt to identify contact information in pended (unauthorized) messages. If contact information is discovered, the message is not acceptable. The observation is that contact information is not necessary for a legitimate sender to identify who they are and/or their reason for contacting. Although the invention primarily concentrates on restricting the sender's use of contact information, the invention also allows an open ended set of heuristics to be brought to bear on a pended message to determine its acceptability or not.

In general, the primary criteria (among many possible criteria) is to limit the logical length of an acceptable message. This makes it much easier to locate possible contact information in a message by precisely bounding the problem (For example, to less then 240 characters of plain-text) before attempting subsequent heuristics.

Contact information is searched for primarily in the human visible content of an email message. Ascertaining contact information is not limited to human visible content. Meta-content can also be search, as well as the message headers, not just the body. The invention merely uses the human visible contents as its primary source of analysis. Secondary, and even tertiary analyses, etc., are allowed by filter plug-ins.

For example, HREF's in HTML meta-contents result in hyperlinks and graphical content such as images to be displayed to an email client user. These meta-references, designed to be incorporated into the human visible contents of a message, are considered (unacceptable) contact info as well, since a hyperlink could allow a reader to "contact" a Web site by visiting it or an image could contain a Web address for the same purpose.

General Kinds of Contact Info
  Web links (For example, browser links that could be automatically recognized by the user's email client and used to launch a Web browser or other Internet application).
  Phone numbers.
  Mailing addresses.
  Web references (Not necessarily automatically recognized by a user's email client, but nevertheless information that could be typed into a browser or other Internet application with little or no modification to invoke the tool to act).

Identifying Contact Info
  Web links are identified in the same manner that a modern word processor or email client recognizes them. URI's, especially URL's, are syntactically specified in W3C standard documents (not referenced here).
  Phone numbers and mailing addresses are each assumed to require numerical digits to express.
  For example, in the case of phone numbers, at least seven, typically 10 digits are required. In the case of addresses, a five digit Zip code is required (in the U.S.A), plus probably at least one digit for a street address. For mailing addresses outside the U.S.A. that may not have numerical street addresses or "region codes" like Zip codes, more sophisticated heuristics may be used. A simple heuristic "no more than four digits, or the semblance of four digits is allowed" is useful.
  For example:
  arabic numerals 0-9=1 digit each.
  "thousand"=1000=4 digits, or '000=3 digits.
  "hundred"=100=3 digits, or '00=2 digits.
  "two hundred"=2, 100=1+(3 or 2) digits=3 or 4 digits.
  Note: "or" above means an implementation can allow this to be a user option—"strict" or "less so". Also, some phone numbers use letters—see the discussion on non-dictionary words below.
  Roman numerals (I, II, III, IV, V, XXV) can be interpreted as their decimal digit expansion.
  The lower case "L" and the letter "O" can be used to represent a numerical "1" or "zero", hence each should be considered a single digit if not embedded in a word in the human dictionary. (Note: some personal computers system ship with the entire English language dictionary included in the file system as a text file, so this is not unreasonable).
  Removing all white space from a message and considering runs of repeated characters as the number of digits found corresponding to the length of the run. (Exception: some Internet messages have a "protective line" toward the bottom of the message that starts with the characters "---". This line is present so that automated systems called "list servers" can interpret the message body above the "protective line" as a command to the server, and ignore data below the line as comments. The invention can special case this. In this particular case, as long as the last line in a message starting with "---" remains unbroken until the end of the line, this specific run will not count as a run of characters interpreted as a possible digits.)

Note: The above possibilities are not exhaustive. They are merely meant to show that simply looking for Arabic numerals is not sufficient.

Web references are the hardest. Nevertheless, blatant references that are well formed for automatic recognition can be easily detected, for example, as lengthy non-human words with "."'s and "/"'s in them in the case of internet URI's/URL's.

If all of the messages pass the filters 415, then the sender is added to the sender ID list (if the sender is not already on the list) 416. The user is notified if the sender has been added to the sender ID list, giving the user the option to add the sender to his inclusive or exclusive address book (as described above).

If any of the messages fail to pass the filters 415, then the sender is warned that its email was rejected and the reason(s) why (Because of all the above criteria, it is helpful to include in a warning response to a sender whose message has been determined not acceptable, as to "why" not) and optionally with suggestions on how to properly answer a challenge message 417.

The user can also be notified each time a message is pended on the domain ID list or sender ID list. By default, the user is notified when a unique new entry is added.

Figure 5:
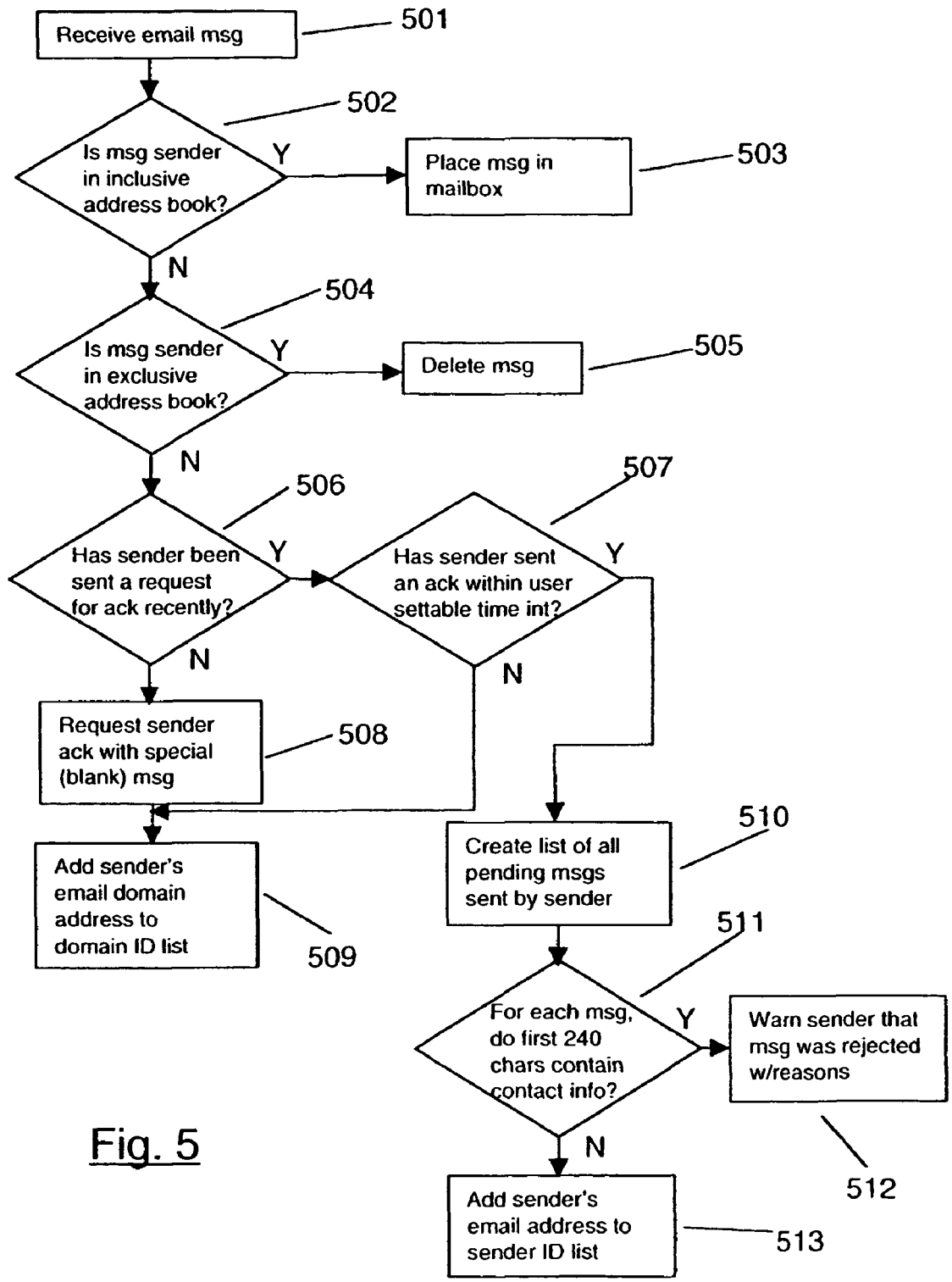
FIG. 5 is a block schematic diagram of a flowchart showing the steps taken in another preferred embodiment of the invention for identifying unauthorized senders of email to a user according to the invention.

Referring to FIG. 5, a flowchart of another preferred embodiment of the invention is shown. This embodiment differs from FIG. 4 in that the sender is sent the challenge message more than once. The invention receives an email 501. The invention checks if the email's sender is listed in the user's inclusive address book or temporary address book 502. If the sender is, then the email is acceptable and is placed in the user's main mailbox 503.

If the sender is not in the inclusive or temporary address book, then the invention checks if the sender is listed in the user's exclusive address book 504. If the sender is, then the message is not wanted by the user, i.e., the sender or the sender's domain is blocked, and it is discarded 505.

If the sender is not listed in the exclusive address book, then the invention checks if the sender has been sent a challenge message recently 506. This challenge resend time span can be user settable. If the sender has not been sent a challenge message recently, then a challenge is issued to the sender, requesting that the sender send an acknowledgement with an acceptable (blank) message body 508. The sender is then placed on the domain ID list (if the sender is not already on the list) 509. This indicates that the sender is a repeat offender and is most likely not filter aware. The user is notified that the sender has been added to the domain ID list, giving the user the option to add the sender to his inclusive or exclusive address book (as described above).

If the sender has been sent a challenge request recently, then the invention checks if the sender has sent a proper acknowledgement to the challenge message within a user settable time interval 507. If the sender has not, then the sender is then placed on the domain ID list (if the sender is not already on the list) 509. The user is notified that the sender has been added to the domain ID list, giving the user the option to add the sender to his inclusive or exclusive address book (as described above).

Otherwise, a list of all the messages from the sender in the pending queue is created 510. Each of the messages in the list have the message bodies truncated to a user settable length (as noted above) and checked if any of the truncated messages contain contact information 511. If any of the messages do not contain contact information, then the sender is added to the sender ID list 513. The sender ID list can reference all messages from such a sender, or just the acceptable ones. Only the acceptable ones are accessible from the sender ID list by default. The user is notified that the sender has been added to the sender ID list, giving the user the option to add the sender to his inclusive or exclusive address book (as described above).

If any of the messages do contain contact information, then the sender is warned that its email was rejected and the reason(s) why 512.

The user is also notified each time a message is pended on the domain ID list or sender ID list or only when a unique entry is added to the list.

Figure 6:
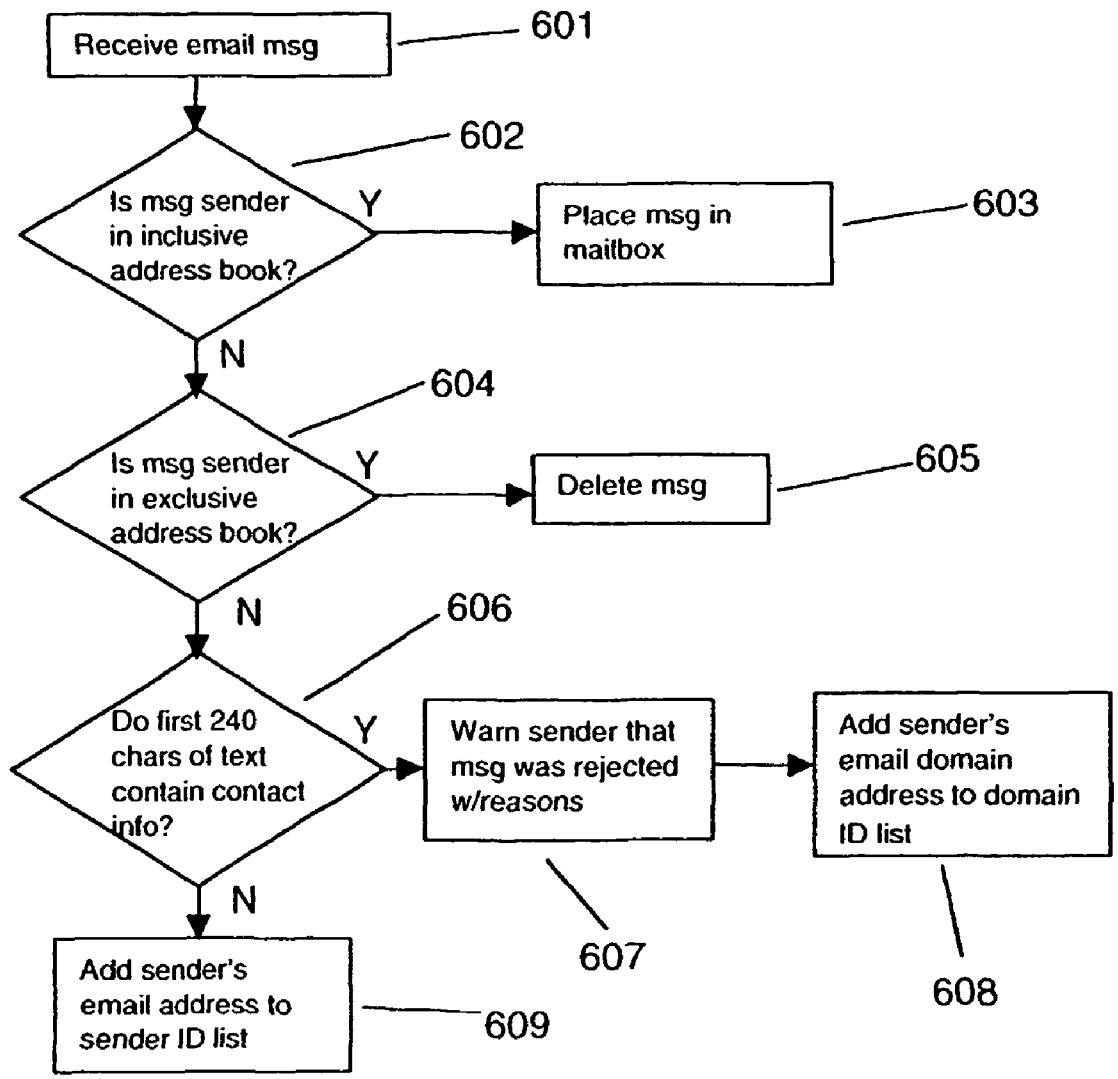
FIG. 6 is a block schematic diagram of a flowchart showing the steps taken in yet another preferred embodiment of the invention for identifying unauthorized senders of email to a user according to the invention.

With respect to FIG. 6, a flowchart of yet another preferred embodiment of the invention is shown. This embodiment differs from FIG. 4 in that no timeouts are used and a challenge message is not issued as a prerequisite for determining acceptability. The invention receives an email 601. The invention checks if the email's sender is listed in the users inclusive address book or temporary address book 602. If the sender is, then the email is authorized and is placed in the user's main mailbox 603.

If the sender is not in the inclusive or temporary address book, then the invention checks if the sender is listed in the user's exclusive address book 604. If the sender is, then the message is not wanted by the user, i.e., the sender or the sender's domain is blocked, and it is discarded 605.

If the sender is not listed in the exclusive or temporary address book, then the invention truncates the message body to a user settable length (as noted above) and checks if the truncated message contains contact information 606. If the message does not contain contact information, then the sender is added to the sender ID list (if the sender is not already on the list) 609. The user is conditionally notified that the sender has been added to the sender ID list, giving the user the option to add the sender to his inclusive or exclusive address book (as described above).

If the message does contain contact information, then the sender is warned that its email was rejected and the reason(s) why 607. The sender is then placed on the domain ID list (if the sender is not already on the list) 608. The user is conditionally notified that the sender has been added to the domain ID list, giving the user the option to add the sender to his inclusive or exclusive address book (as described above).

The user is also conditionally notified each time a message is pended on the domain ID list or sender ID list.

Figure 7:
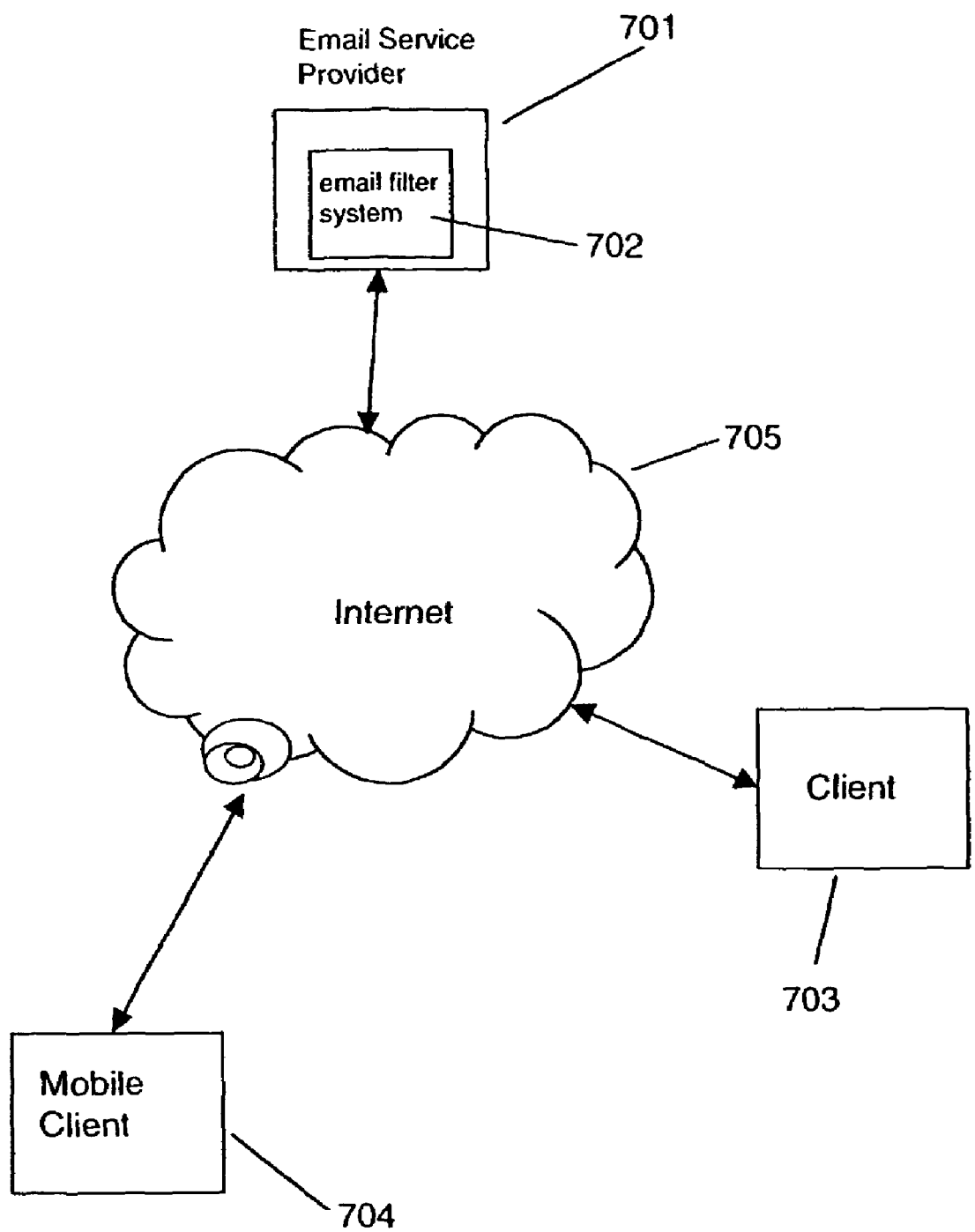
FIG. 7 is a diagram showing a preferred embodiment of the invention integrated into an email service provider's email server according to the invention.

Referring to FIG. 7, the invention is easily integrated into an email service provider's email system. An example of the task structure of such a system is described below in FIG. 9. The invention 702 resides on the email service provider's server 701. The invention 702 adds to the email services already provided by the email service provider's email system. Email is received and sent at the server 701 In the normal fashion. The server side implementation 701, 702 allows users 703 to manage their address books on the server using an open protocol across the Internet or network 705.

The invention 702 splits a user's incoming message into two mailboxes: those senders in the user's address book and those that are not. Using this approach, existing email enabled devices (e.g., mobile clients 704) can access the "in address book" mailbox exclusively via the Internet or network 705 and receive no spam without any changes being made to the implementation of the devices.

A typical client 703 accesses his email through the Internet or network 705 via the invention 702 on the email service provider's server 701. With the integration of the invention with the normal email services, the user's address books function as described above with the user having to maintain one inclusive address book rather than one inclusive address book and an email client address book as described below in the non-integrated approach.

Additionally, mobile client devices 704 can be modified so that they could use the open protocol to manage their address book on the server from the road. As described below mobile client devices can fully implement the invention onboard if more intelligence is desired.

Figure 8:
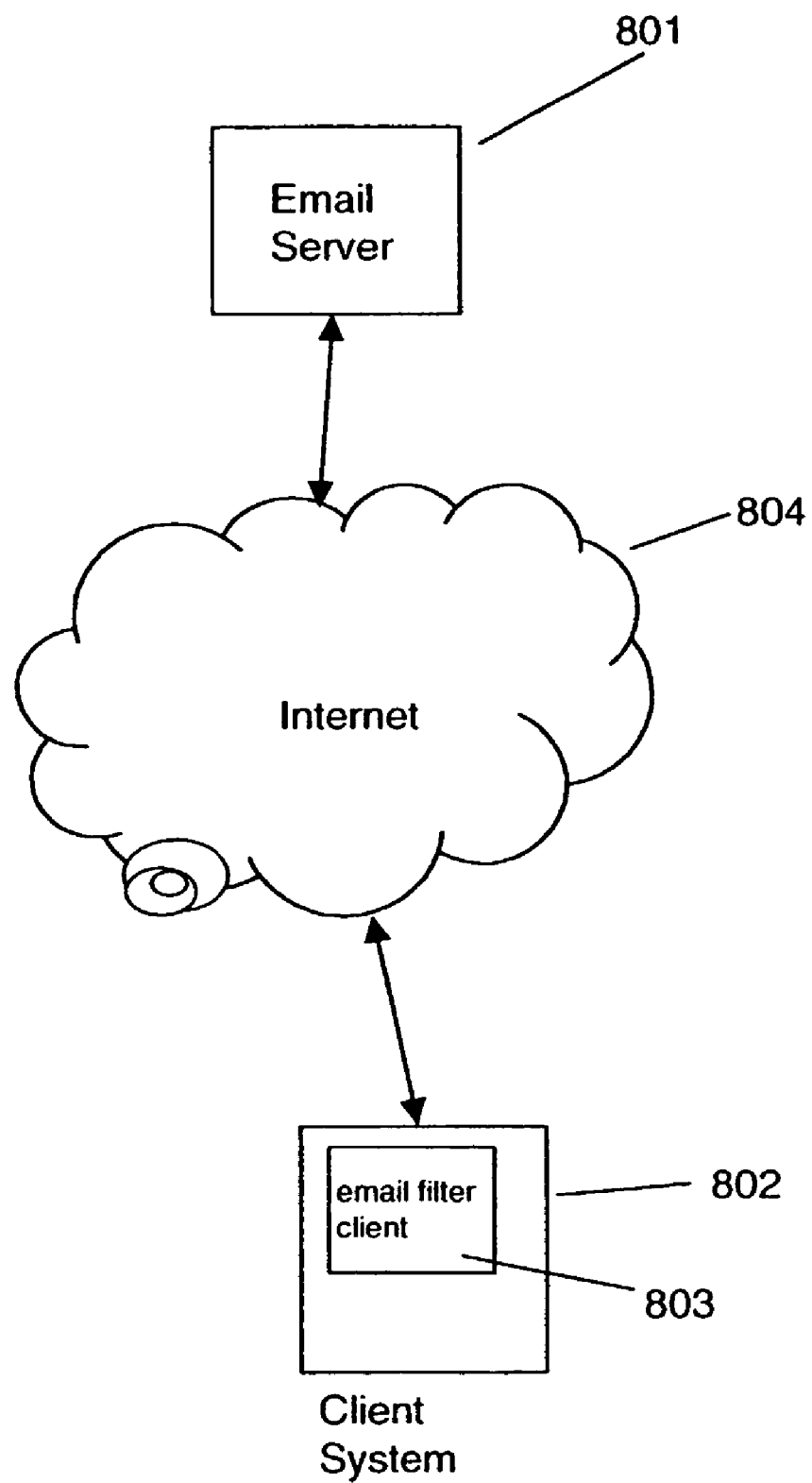
FIG. 8 is a diagram showing a preferred embodiment of the invention integrated into an client email program according to the invention.

With respect to FIG. 8, the invention is preferably integrated into a client system's 802 resident email client 803. An example of the task structure of such a system is described below in FIG. 9. The integrated email filter client 803 adds to the email services already provided by the standalone email client. Email is received from the email server 801 and sent via the email server 801 in the normal fashion. The email server 801 is a POP, IMAP, or other standards-based or proprietary email server.

The user's address books, mailboxes, and queues are maintained locally by the integrated email filter client 803 on the client system 802.

Figure 9:
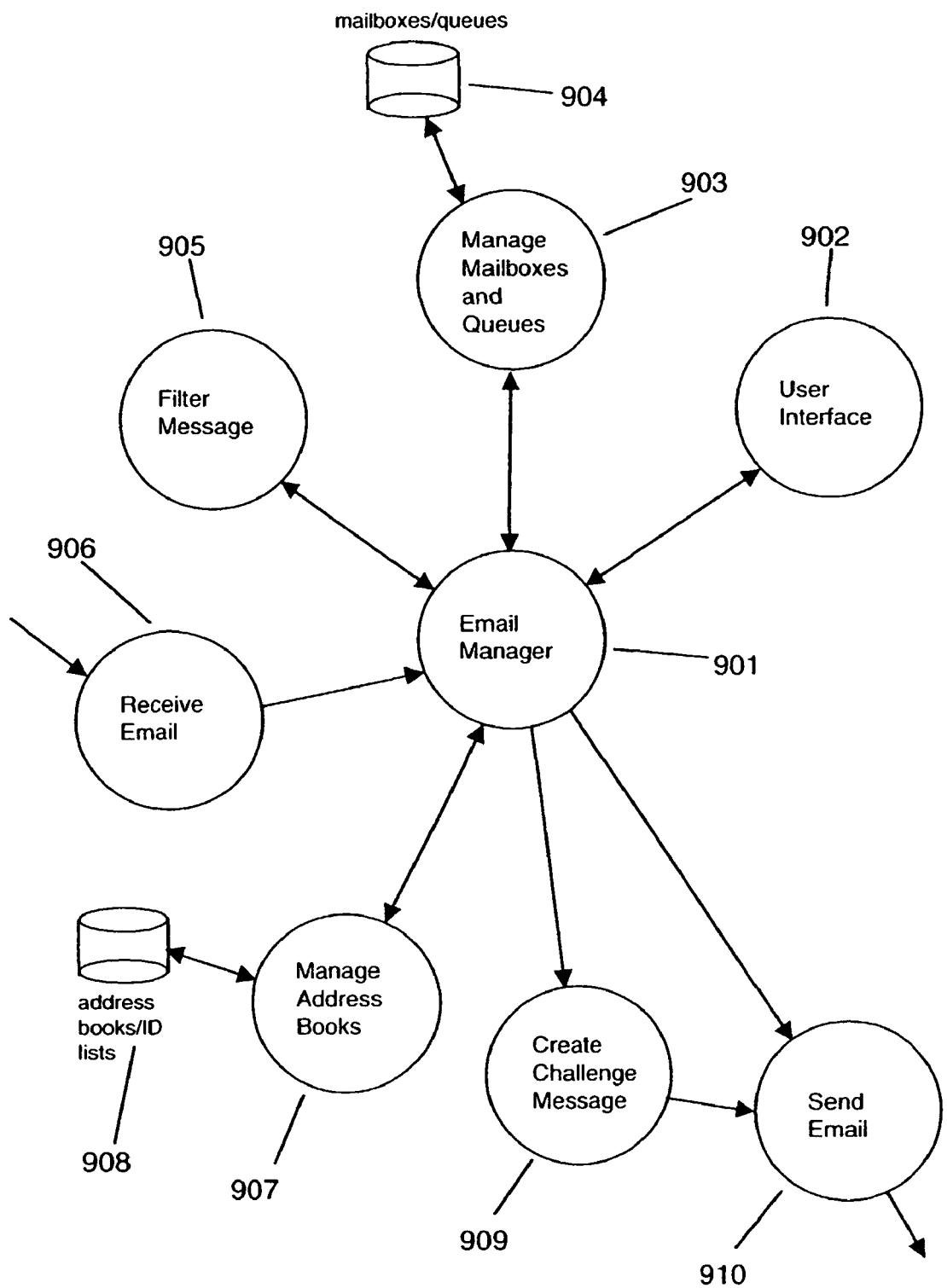
FIG. 9 is a block schematic diagram of a task viewpoint of the integrated invention according to the invention.

Referring to FIG. 9, a task oriented viewpoint of the invention is shown. This structure performs the functions described in FIGS. 4, 5, and 6. The Receive Email module 906 receives email sent to the system directly (if integrated with an email service provider's email server) or receives email from an email server (e.g., POP, IMAP, or other standards-based or proprietary email server). Emails are sent to the Email Manager 901 which performs the checks detailed in FIGS. 4, 5, and 6.

The user's inclusive address book is checked via the Manage Address Books module 907. The Manage Address Books module 907 accesses the user's stored address books 908 for the inclusive address book. The Manage Address Books module 907 sends the Email Manager 901 an indicator telling the Email Manager 901 whether the sender is in the list.

Any immediately authorized messages are stored in the user's mailbox via the Manage Mailboxes and Queues module 903. The Manage Mailboxes and Queues module 903 stores the messages into the user's mailbox 904.

The user's exclusive address book is checked via the Manage Address Books module 907. The Manage Address Books module 907 sends the Email Manager 901 an indicator telling the Email Manager 901 whether the sender is in the list. Email from senders in the user's exclusive address book are deleted.

Messages are filtered using the Filter Message module 905. The Filter Message module 905 filters messages through the extensible filters described above. Indicators are supplied to the Email Manager 901 by the Filter Message module 905 indicating if a message passed all of the filters. If a message did not pass any of the filters, any reason(s) why are included.

Challenge messages are initiated by the Email Manager 901 through the Create Challenge Message module 909. The formatted challenge message is sent to the sender via the Send Email module 910. The Send Email module 910 sends email directly to the sender's email address (if integrated with an email service provider's email server) or sends email via an email server (e.g., SMTP, or other standards-based or proprietary email server). Challenges sent through the Send Email module 910 do not add the destination address of the challenged recipient to the users temporary address book.

Rejection messages are created by the Email Manager 901 and sent to the sender via the Send Email module 910.

Optionally, the Email Manager 901 recognizes when the user is sending a message to a someone they have never sent to before. The Email Manager 901 constrains the contents of the outgoing message, just as it constrains the contents of unauthorized incoming messages. This ensures that the user knows, if the recipient is using the invention's technology, he has at least formulated an acceptable message. This can be selected by the user.

Any messages destined for a pending queue are stored in the user's queues via the Manage Mailboxes and Queues module 903. The Manage Mailboxes and Queues module 903 stores the message into the appropriate queue 904.

The User Interface 902 gives the user access to messages in his mailboxes, allows him to set options and preferences, and to access email functions such as creating and sending messages.

The User Interface 902 allows the user to optionally warn a sender when the sender has been manually authorized.

As noted above, the authorization acknowledgment (challenge) message can be a static message or fully editable by the user via the User Interface 902.

The User Interface 902 can present to the user an indicator as to which unauthorized senders have actually been sent a challenge message. It also allows the user to manually force the Email Manager 901 to send a challenge message to a sender that it did not automatically send one to and also to stop a challenge message from being sent to a sender.

If the challenge message was not sent to the sender due to an error and/or a time out (unreachable network), the Email Manager 901 can tell the user that the action could not be completed via the User Interface module 902.

The User Interface module 902 can highlight "interesting senders"" as defined below. The highlighting of each type of interesting sender is visibly distinct (in color and icon) from all others:

1. A sender whose message is sent *exclusively to* an authorized user and/or the user protected email account.
    Note: A user is not required, nor does the system automatically authorized a protected account's email address, but the address can always be used by the UI for determining "interesting senders".
2. A sender whose reply-to address is an authorized address.
3. Both of the above.

For example, "red—down arrow", "yellow—right arrow" and "green—up arrow" icons may be used to distinguish different kinds of interesting senders from each other and from merely pended messages.

In practice, highlighting the above interesting senders via the User Interface module 902 allows e-invitations, e-cards, and/or other correspondence sent indirectly by a known (authorized) sender, through an unauthorized proxy, to be easily distinguished by the user. The interesting senders can also be presented in an order of precedence.

This allows a domain to be presented as an "interesting domain" based on the "highest precedent" of interesting sender inside that domain. The precedence can be:
 1. both reply-to is authorized, and sent "exclusive to"
 2. reply-to is authorized
 3. "uncontrollable length" acceptable
 4. "exclusive to"
 Where: 1 is the highest, 4 is always the lowest, and often spam.

For example, if "Chun" is authorized, and she sends a user an e-card on his birthday from "greetings@yahoo.com", which is not authorized. Although the message is pended (because greetings@yahoo.com is not authorized) the User Interface module 902 highlights the message as being from an interesting sender. The type of interesting sender is implicit in its distinct highlighting.

The user has the option of independently displaying each kind of interesting sender on the sender ID list as well as, or instead of, on the domain ID list.

A user attempting to inspect the contents of an "exclusive to" interesting sender's message can be warned that the message is "unacceptable", why, that it is very likely "spam", and that they are strongly advised NOT to open it unless they recognize the senders email address.

The User Interface module 902 can display only the last N days of entries. It can highlight, say the last 24 hours of entries, for example, so the user can distinguish recent entries from older ones. The time intervals are user configurable.

The "only display the last N days" criteria is set to the maximum of the current setting or the setting at the last time the user used the system. If the user normally shows only the last two days, but then goes away on vacation for two weeks, then the next time he uses the system, he will see the last two weeks of messages, until he resets the time interval. This is to ensure that the user never loses messages because he was away from the system.

Users also have the option to turn the invention off through the User Interface module 902. This results in temporarily allowing every new message through.

Users have the option of specifying an account as "public"; where messages directed exclusively to that account are automatically authorized. This allows a user to accept to a public address, such as a support or feedback address, while still cutting down on the spam to that address (which is publicly posted). Note, the user will receive spam under these conditions, but it will be less than not doing anything at all.

Figure 10:
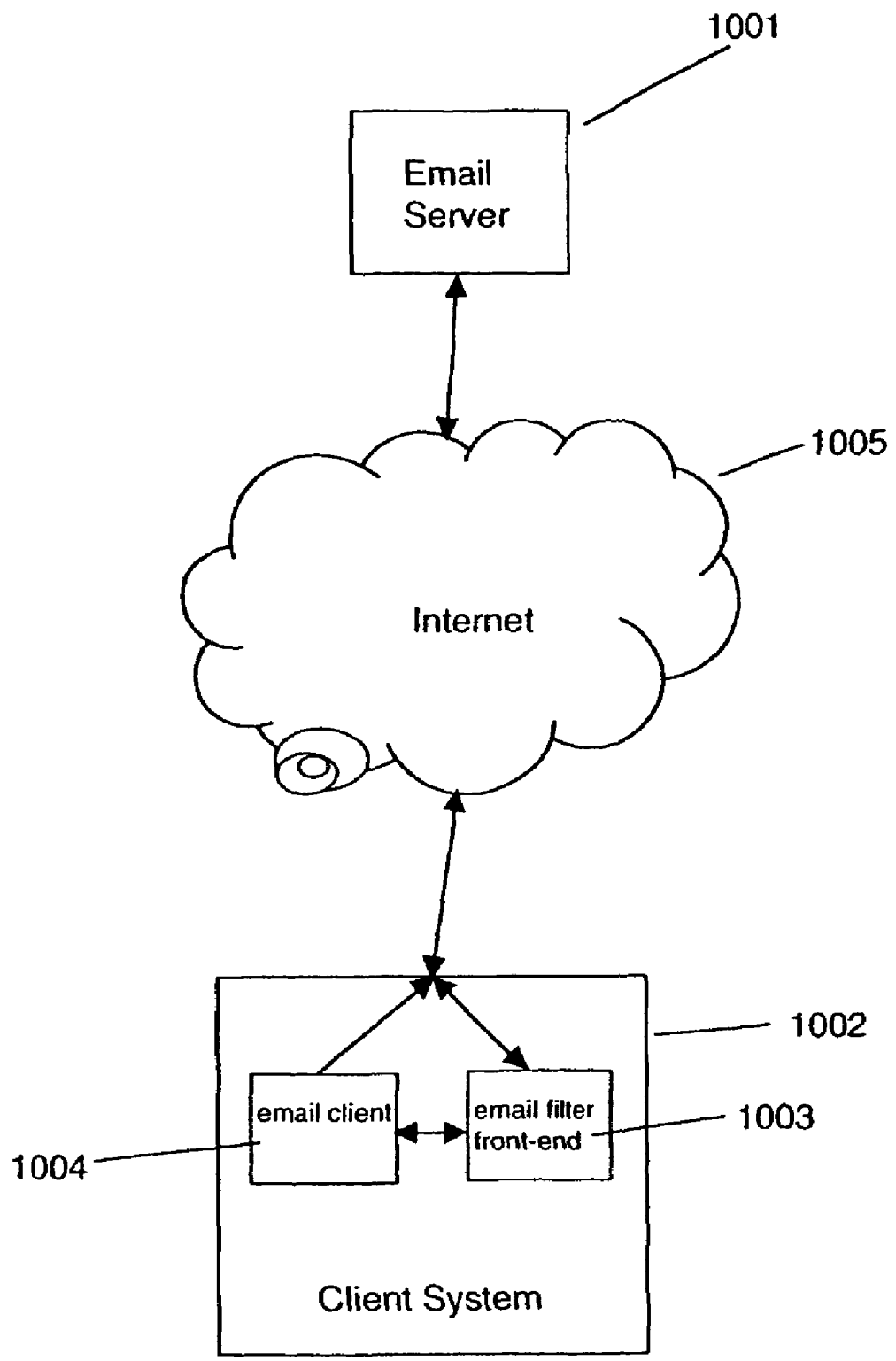
FIG. 10 is a diagram showing a preferred embodiment of the invention acting as a front-end to an email client according to the invention.

With respect to FIG. 10, the invention can be configured to act as a front-end (non-integrated implementation) 1003 for an email client 1004 on a client system 1002. The invention receives the user's email from the user's email server 1001 through the Internet or network 1005. The invention performs the filtering and challenging of messages as described above and in FIGS. 4, 5, and 6.

Any messages that are deemed acceptable and that would be placed in the user's mailbox in the above implementations are sent to the email client 1004. The email client 1004 thinks that the email sent by the invention 1003 has been sent by the email server 1001. This approach allows the invention 1003 to appear transparent to the email client 1004.

Figure 11:
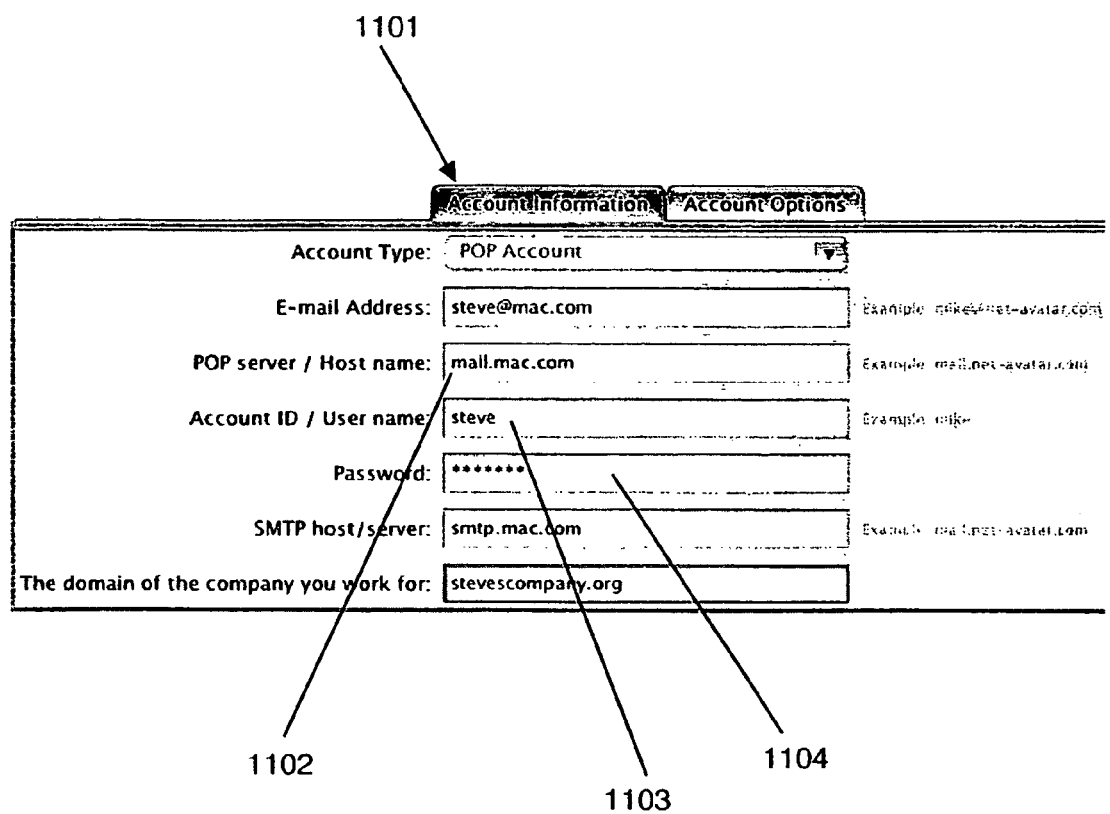
FIG. 11 is a diagram of an account information user interface preference window for the invention according to the invention.

Referring to FIG. 11, the user configures the invention 1003 by launching the invention 1003 and selecting the "Preferences" panel 1101. The user enters his email account information for the email server, i.e., Host name 1102, User name 1103, and Password 1104, into this panel 1101. This sets up the invention 1003 to access the email server 1001 for the user's incoming email and for the sending of challenge and rejection messages to senders.

With respect to FIG. 12, the user must then configure his email client 1004 to accept email from the invention 1003. The user sets his email clients account information 1201 to access the invention locally 1202, 1203. This ensures that the email client 1004 will only go to the invention 1003 for new email messages.

The invention 1003 automatically builds an initial address book/contact list for the user based on the contents of his mailboxes in the email client 1004.

Figure 13:
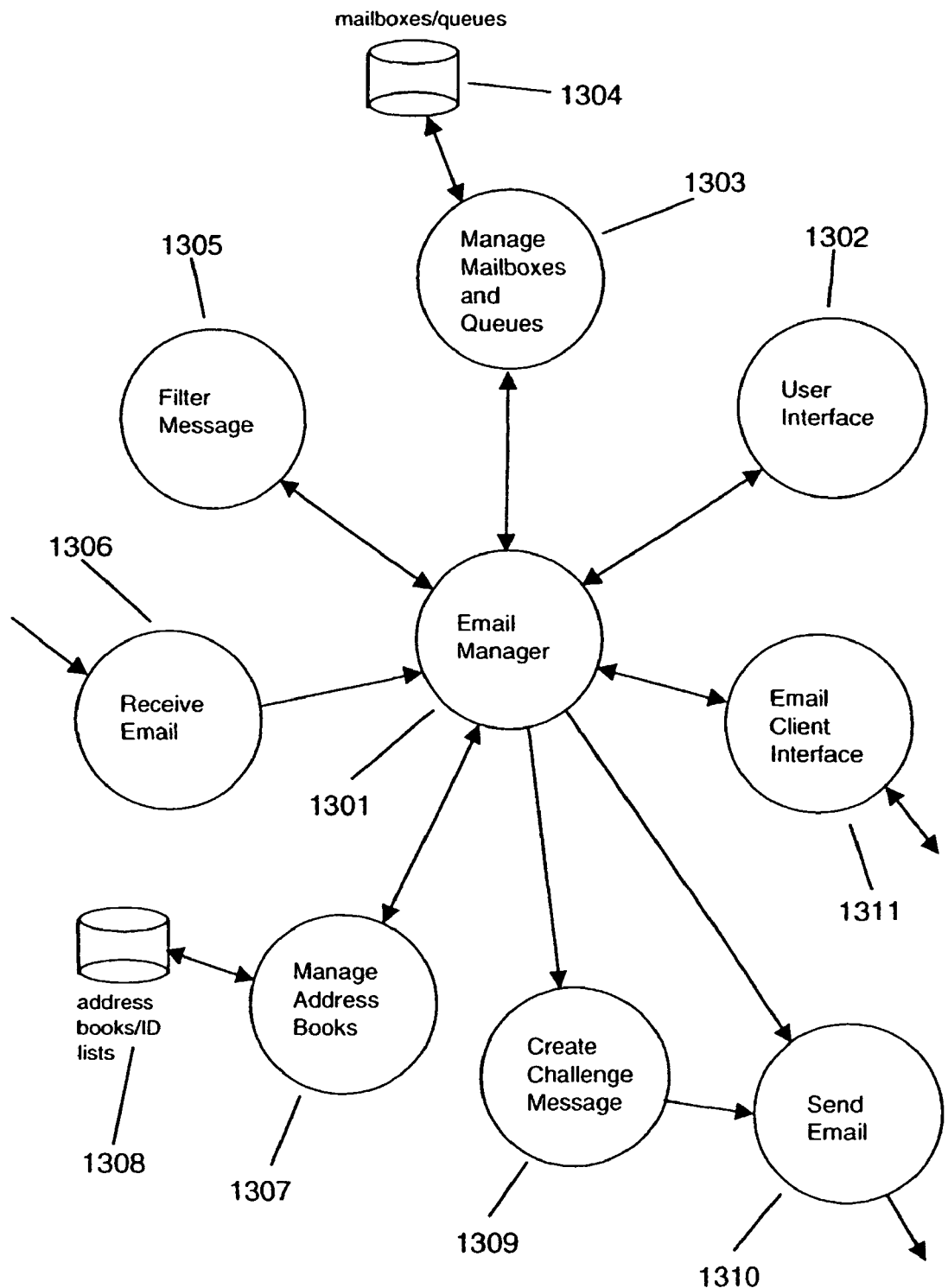
FIG. 13 is a block schematic diagram of a task viewpoint of the front-end implementation of the invention according to the invention.

Referring to FIG. 13, a task viewpoint of the non-integrated approach is shown. The tasks shown operate in the same manner as those in FIG. 9 except that the user's main mailbox is not kept in the mailboxes/queues 1304. The messages destined for the user's main mailbox are sent by the Email Manager 1301 to the email client via the Email Client Interface module 1311.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A process for detecting and challenging unsolicited electronic mail (email) sent to a user in a computer environment, comprising the steps of:

providing an inclusive email address book comprising a list of email addresses and domain names;

receiving an email message destined for a particular user;

placing said email message into the user's main mailbox only if said email message is sent by an email address or a domain name in said inclusive address book;

providing an exclusive email address book comprising a list of email addresses and domain names;

deleting said email message if said email message is sent by an email address or a domain name in said exclusive address book;

truncating the body of said email message to a predetermined length;

providing at least one filter means for analyzing particular aspect(s) of said truncated email body;

sending said truncated email body through said at least one filter means;

wherein said at least one filter means provides a pass/fail indication;

rejecting said email message if said truncated email body fails at least one of said at least one filter means;

wherein if said email message is rejected, then said email message's sender is sent a message notifying said sender that said email message was rejected and any reasons why;

adding said email message's sender to an accepted sender list if said truncated email body passes all of said at least one filter means;

wherein the user is notified that said sender has been placed on said accepted sender list if said sender was added to said accepted sender list;

wherein the user can add said sender to said inclusive address book or said exclusive address book;

wherein if the user adds said sender to said exclusive address book, then said email message is deleted;

wherein if the user adds said sender to said inclusive address book, then said email message is added to said main mailbox; and wherein said predetermined length is user settable.

2. The process of claim 1, wherein said filter means analyzes said truncated email body for any of: offending words, phrases, commercial content, phone numbers, mailing addresses, Web links, contact information, and attachments.

3. A process for detecting and challenging unsolicited electronic mail (email) sent to a user in a computer environment, comprising the steps of:

providing an inclusive email address book comprising a list of email addresses and domain names;

receiving an email message destined for a particular user; and placing said email message into the user's main mailbox only if said email message is sent by an email address or a domain name in said inclusive address book;

providing a temporary email address book comprising a list of email addresses that the user has sent email messages to and that are not in said inclusive address book;

wherein said temporary address book retains an email address for a predetermined amount of time before removing the email address; and placing said email message into the user's main mailbox if said email message is sent by an email address or a domain name in said temporary address book.

4. The process of claim 3, further comprising the steps of:
providing an exclusive email address book comprising a list of email addresses and domain names; and
deleting said email message if said email message is sent by an email address or a domain name in said exclusive address book.

5. The process of claim 3, wherein said predetermined amount of time is user settable.

6. The process of claim 3, further comprising the steps of:
truncating the body of said email message to a predetermined length;
providing at least one filter means for analyzing particular aspect(s) of said truncated email body;
sending said truncated email body through said at least one filter means;
wherein said at least one filter means provides a pass/fail indication; and
rejecting said email message if said truncated email body fails at least one of said at least one filter means.

7. The process of claim 6, wherein said filter means analyzes said truncated email body for any of: offending words, phrases, commercial content, phone numbers, mailing addresses, Web links, contact information, and attachments.

8. The process of claim 6, wherein said predetermined length is user settable.

9. The process of claim 6, wherein if said email message is rejected, then said email message's sender is sent a message notifying said sender that said email message was rejected and any reasons why.

10. The process of claim 6, further comprising the step of:
adding said email message's sender to an accepted sender list if said truncated email body passes all of said at least one filter means;
wherein the user is notified that said sender has been placed on said accepted sender list if said sender was added to said accepted sender list;
wherein the user can add said sender to said inclusive address book; and
wherein if the user adds said sender to said inclusive address book, then said email message is added to said main mailbox.

11. The process of claim 4, further comprising the step of:
sending said email message's sender a challenge message if said sender is not listed in said inclusive address book and said exclusive address book; and
wherein said challenge message instructs said sender on how to properly respond to said challenge message.

12. The process of claim 11, further comprising the steps of:
receiving a response to said challenge message from said sender;
analyzing said response for proper response format;
adding said sender to an accepted sender list if said response is in the proper response format and said sender is not already on said accepted sender list; and
wherein the user is notified that said sender has been placed on said accepted sender list if said sender was added to said accepted sender list.

13. The process of claim 12, further comprising the step of:
adding said sender's domain name to an unaware domain list if said response is not in the proper response format and said sender is not already on said unaware domain list; and
wherein the user is notified that said sender has been placed on said unaware domain list if said sender's domain was added to said unaware domain list.

14. The process of claim 13, wherein the user selects said sender to be placed in said inclusive address book.

15. A process for detecting and challenging unsolicited electronic mail (email) sent to a user in a computer environment, comprising the steps of:
receiving an email message destined for a particular user;
truncating the body of said email message to a predetermined length;
providing at least one filter means for analyzing particular aspect(s) of said truncated email body;
sending said truncated email body through said at least one filter means;
wherein said at least one filter means provides a pass/fail indication;
rejecting said email message if said truncated email body fails at least one of said at least one filter means; and
adding said email message's sender to an accepted sender list if said truncated email body passes all of said at least one filter means;
wherein the user is notified that said sender has been placed on said accepted sender list if said sender was added to said accepted sender list;
wherein the user can add said sender to an address book; and
wherein if the user adds said sender to said address book, then said email message is added to the user's main mailbox.

16. The process of claim 15, wherein said filter means analyzes said truncated email body for any of: offending words, phrases, commercial content, phone numbers, mailing addresses, Web links, contact information, and attachments.

17. The process of claim 15, wherein said predetermined length is user settable.

18. The process of claim 15, wherein if said email message is rejected, then said email message's sender is sent a message notifying said sender that said email message was rejected and any reasons why.

19. A process for detecting and challenging unsolicited electronic mail (email) sent to a user in a computer environment, comprising the steps of:
providing an inclusive email address book comprising a list of email addresses and domain names;
receiving an email message destined for a particular user;
placing said email message into the user's main mailbox only if said email message is sent by an email address or a domain name in said inclusive address book;
truncating the body of said email message to a predetermined length;
providing at least one filter means for analyzing particular aspect(s) of said truncated email body;
sending said truncated email body through said at least one filter means;
wherein said at least one filter means provides a pass/fail indication;
rejecting said email message if said truncated email body fails at least one of said at least one filter means; and
adding said email message's sender to an accepted sender list if said truncated email body passes all of said at least one filter means;

wherein the user is notified that said sender has been placed on said accepted sender list if said sender was added to said accepted sender list;

wherein the user can add said sender to said inclusive address book; and wherein if the user adds said sender to said inclusive address book, then said email message is added to said main mailbox.

20. The process of claim 19, further comprising the steps of:

providing an exclusive email address book comprising a list of email addresses and domain names; and deleting said email message if said email message is sent by an email address or a domain name in said exclusive address book.

21. The process of claim 20, further comprising the step of:

sending said email message's sender a challenge message if said sender is not listed in said inclusive address book and said exclusive address book; and wherein said challenge message instructs said sender on how to properly respond to said challenge message.

22. The process of claim 21, further comprising the steps of:

receiving a response to said challenge message from said sender;

analyzing said response for proper response format;

adding said sender to an accepted sender list if said response is in the proper response format and said sender is not already on said accepted sender list; and wherein the user is notified that said sender has been placed on said accepted sender list if said sender was added to said accepted sender list.

23. The process of claim 22, further comprising the step of:

adding said sender's domain name to an unaware domain list if said response is not in the proper response format and said sender is not already on said unaware domain list; and wherein the user is notified that said sender has been placed on said unaware domain list if said sender's domain was added to said unaware domain list.

24. The process of claim 23, wherein the user selects said sender to be placed in said inclusive address book.

25. The process of claim 19, wherein said filter means analyzes said truncated email body for any of: offending words, phrases, commercial content, phone numbers, mailing addresses, Web links, contact information, and attachments.

26. The process of claim 19, wherein said predetermined length is user settable.

27. The process of claim 19, wherein if said email message is rejected, then said email message's sender is sent a message notifying said sender that said email message was rejected and any reasons why.

* * * * *

UNITED STATES PATENT AND TRADEMARK OFFICE
CERTIFICATE OF CORRECTION

| | |
|---|---|
| PATENT NO. | : 7,433,923 B2 |
| APPLICATION NO. | : 10/491759 |
| DATED | : October 7, 2008 |
| INVENTOR(S) | : Reginald Adkins |

Page 1 of 1

It is certified that error appears in the above-identified patent and that said Letters Patent is hereby corrected as shown below:

On the Title Page,

ADD SECTION (60) - RELATED U.S. APPLICATION DATA:

"Provisional Application No. 60/326,965, filed Oct. 3, 2001."

Signed and Sealed this

Second Day of December, 2008

JON W. DUDAS
*Director of the United States Patent and Trademark Office*